(12) United States Patent
Vilain et al.

(10) Patent No.: US 7,990,090 B2
(45) Date of Patent: Aug. 2, 2011

(54) METHOD FOR DETERMINING THE POSITION OF A ROTOR OF A SYNCHRONOUS MACHINE HAVING AT LEAST ONE EXCITATION WINDING

(75) Inventors: Jean-Paul Vilain, Melicocq (FR); Luc Kobylanski, Paris (FR); Ferhat Chabour, Compiegne (FR)

(73) Assignee: Valeo Equipements Electriques Moteur, Creteil (FR)

( * ) Notice: Subject to any disclaimer, the term of this patent is extended or adjusted under 35 U.S.C. 154(b) by 525 days.

(21) Appl. No.: 12/159,261

(22) PCT Filed: Dec. 14, 2006

(86) PCT No.: PCT/FR2006/051357
§ 371 (c)(1),
(2), (4) Date: Sep. 5, 2008

(87) PCT Pub. No.: WO2007/080294
PCT Pub. Date: Jul. 19, 2007

(65) Prior Publication Data
US 2011/0115424 A1     May 19, 2011

(30) Foreign Application Priority Data
Jan. 11, 2006 (FR) .................................. 06 00224

(51) Int. Cl.
*H02P 6/18* (2006.01)
(52) U.S. Cl. ............... 318/400.32; 318/254; 318/400.08; 318/400.34

(58) Field of Classification Search .................. 318/254, 318/265, 400.08, 400.32, 400.34, 430, 432, 318/721, 800
See application file for complete search history.

(56) References Cited

U.S. PATENT DOCUMENTS

| | | | |
|---|---|---|---|
| 3,909,688 A | 9/1975 | Blaschke et al. | |
| 4,746,850 A | 5/1988 | Abbondanti | |
| 6,483,266 B2 * | 11/2002 | Miyazaki et al. | 318/400.34 |
| 6,570,351 B2 * | 5/2003 | Miyazaki et al. | 318/400.32 |
| 6,624,602 B2 * | 9/2003 | Ikegami et al. | 318/400.08 |
| 2002/0033682 A1 * | 3/2002 | Ikegami et al. | 318/254 |
| 2002/0050800 A1 * | 5/2002 | Miyazaki et al. | 318/254 |
| 2002/0171381 A1 * | 11/2002 | Miyazaki et al. | 318/254 |
| 2005/0283324 A1 | 12/2005 | Swanson | |
| 2009/0218965 A1 * | 9/2009 | Williams et al. | 318/265 |
| 2010/0052587 A1 * | 3/2010 | Bonvin et al. | 318/400.32 |

FOREIGN PATENT DOCUMENTS

| | | |
|---|---|---|
| EP | 0 454 039 A1 | 10/1991 |
| FR | 2 249 479 | 5/1975 |
| FR | DE10114293 | 4/2004 |

* cited by examiner

*Primary Examiner* — Paul Ip
(74) *Attorney, Agent, or Firm* — Berenato & White, LLC

(57) ABSTRACT

A method for determining the position at rest of a rotor of a machine having at least one excitation winding. The invention provides a technique for detecting the position of the rotor at rest, from information contained in the voltages produced at the terminals of the stator windings, when the voltage applied to the rotor winding undergoes variations. The invention thus makes it possible to detect the rest position of the wound-rotor machine in the absence of ordinary position sensors such as magnetic, optical, resolving, mechanical, capacitive or other sensors.

18 Claims, 9 Drawing Sheets

METHOD FOR DETERMINING THE POSITION OF A ROTOR OF A SYNCHRONOUS MACHINE HAVING AT LEAST ONE EXCITATION WINDING

CROSS-REFERENCE TO RELATED APPLICATIONS AND CLAIM TO PRIORITY

This application relates to International Application No. PCT/FR2006/051357 filed Dec. 14, 2006 and French Patent Application No. 0600224 filed Jan. 11, 2006, of which the disclosures are incorporated herein by reference and to which priority is claimed.

FIELD OF THE INVENTION

The invention concerns a method of determining the position, at rest or at low speed, of a rotor of a synchronous machine provided with at least one excitation winding. The present invention finds particularly advantageous, but not exclusive, applications in the fields of the automotive sector, the aeronautic sector and the industrial sector.

It also concerns a device implementing the said method of determining the position, at rest or at low speed, of a rotor of a synchronous machine provided with at least one excitation winding.

PRIOR ART

Currently, an automatically controlled synchronous electrical machine comprises two concentric parts, a rotating part that is the rotor and a fixed part that is the stator. The electrical machine is for example a reversible machine such as an alternator starter. The rotor and stator are separated by an air gap. The stator comprises a plurality of stator windings, referred to as the phases of the machine. These stator windings, evenly distributed around a central axis of the machine, generate a rotating magnetic field.

The rotor can be provided with a permanent magnet. The rotor can also be provided with one or more excitation windings disposed so that their mutual inductances with the stator windings are a function of the position of the said rotor.

One problem encountered with this type of machine is that it is necessary to determine the angular position at rest of the rotor with respect to the stator windings in order to be able to make the electrical machine start with maximum torque. This is because, in order to control a device controlling the machine supplying the stator windings, it is necessary to determine the angular position of the rotor at the moment when supply voltages are applied to the stator windings. Knowing this position, it is then possible to supply the machine so as that the flux created at the stator always remains substantially in electrical quadrature with the rotor flux, thus making it possible to obtain maximum torque. Knowledge of this position also makes it possible to fix the starting direction of the machine.

A first conventional solution to the problem of determining the angular position of the rotor consists of equipping the electrical machine with position sensors such as three Hall effect magnetic sensors. These three magnetic sensors are offset spatially by 120 degrees electrical. The ratio between the electrical degrees and the mechanical degrees depends on the number of poles of the rotor. An electrical period is a complete turn between one north pole and the following north pole of the rotor. This electrical period is equal to 360° electrical.

The magnetic sensors are situated in the magnetic field of a magnetic target fixed to the rotor of the machine. This magnetic target undergoes a magnetisation operation, carried out in the factory. The magnetic sensors are fixed to the stator, facing this magnetic target, so as to switch during reversals of magnetic fields. A Hall effect sensor is arranged so as to be able to detect the variations in an adjacent magnetic field.

For a period of 360° electrical, each magnetic sensor delivers a binary signal equal to 0 over an angular period of 180° electrical and a binary signal equal to 1 over the rest of the period. The logic combination of these three binary signals makes it possible to derive therefrom the angular position of the rotor with a resolution of 60° electrical.

This resolution can be refined by an increase in the number of magnetic sensors. This type of sensor makes it possible to detect the position of the rotor both at rest and during the rotation of the said rotor.

Such a solution has various drawbacks. In particular, Hall effect magnetic sensors are relatively expensive and mounting them close to the machine increases the space requirement of the latter. In addition, it is necessary to use, in addition to cables supplying the machine, other cables for supplying the Hall effect magnetic sensors and the connections for collecting the information supplied by the said sensors. It goes without saying that arranging such cables and connections in an environment that is difficult to access where the sensors are installed runs counter to constraints of manoeuvrability, weight, robustness, reliability and cost. In addition, the magnetisation operation performed on the magnetic target increases the total cost of such a machine.

A second conventional solution to the problem of determining the angular position of the rotor consists of equipping the machine with optical sensors. These optical sensors detect the passage of a reflective or opaque band fixed to the rotor. They are of the same operating type as the Hall effect sensors previously described. Likewise, the resolution is 60 degrees electrical. This type of sensor has the same drawbacks as magnetic sensors.

These positions sensors of the prior art have a considerable drawback because the detection method used for discerning the position of the rotor is a mechanical detection of the position of the rotor having a mechanical angular resolution. With this method, the more the number of pairs of poles of the rotor increases, the more the electrical resolution degrades.

A third conventional solution to the problem of determining the position of the rotor consists of equipping the machine with a resolver for supplying an almost absolute position of the rotor with respect to the stator. One drawback of such a solution lies in the fact that the resolver is fragile and difficult to use in the machine. This solution is more expensive than the previous solutions even though its performance is appreciably superior to those of the said solutions.

It is therefore observed that the solutions proposed in the prior art for responding to the problem of detecting the position of the rotor at rest are not satisfactory for responding in particular to constraints of space requirement, reliability, weight and in particular cost and to preoccupations particular to specific application fields, such as automobiles.

DISCLOSURE OF THE INVENTION

The aim of the invention is precisely to remedy the drawbacks of the techniques disclosed previously. For this purpose, the invention proposes to modify the existing techniques for detecting the position of the rotor at rest for the purpose of eliminating the usual position sensors and the magnetic target. This elimination of such elements in the invention makes it possible to eliminate the cables as well as the connections, so as to respond in particular to the constraints of cost, manoeuvrability, space requirement, weight and reliability.

The invention thus allows a detection of the position at rest of the wound-rotor machine in the absence of normal position sensors such as magnetic, optical, resolver, mechanical, capacitive etc sensors.

The elimination of the sensor and of its fitting gives rise to a saving in space in the machine and hence a subsequent possibility of increasing the power of the machine for the same available volume.

The invention proposes a technique of detecting the position of the rotor at rest or in very slow rotation, from information contained in the voltages generated at the terminals of the stator windings, when the voltage applied to the rotor winding is subject to variations.

With the invention, the only measurements necessary for implementing the detection technique are voltage measurements. They therefore do not require any specific transducer, whence a reduced cost.

This technique of the invention uses an electrical detection method increasing in the same way the precision on the position of the rotor. With this method, the number of pairs of poles of the rotor can be increased without for all that losing this precision. This method makes it possible to determine an electrical position of the rotor that is an angle between the magnetic axes of the stator windings and the magnetic axes of the rotor.

The technique of detecting the position at rest of the rotor of the invention provides firm rapid starting of the machine in the correct direction. It also provides a start of rotation for an application of a method of detecting the position of the rotor in rotation.

With the invention, automatic control is no longer based simply on the position of the rotor but on electromagnetic phenomena. Because of this the performance of the control of the control device is appreciably improved.

More precisely, the object of the invention is a method of determining the position of a rotor of a machine, the rotor being provided with at least one excitation winding, the excitation winding being connected to a chopper, the machine comprising n stator windings, n being an integer, the rotor being magnetically coupled with each of the n stator windings of the machine, this machine being connected to a control device able to control it in full wave mode or pulse width modulation mode.

In accordance with the invention, the method comprises the following steps:
  inhibition of the control device,
  application of an excitation voltage variable over time to the rotor, by means of the chopper,
  measuring an induced electromotive force ($e_1$, $e_2$ or ... $e_n$) in each of the stator windings,
  determining a position of the rotor at rest or at low speed, from at least one operation of comparison of the induced electromotive forces with each other and at least one operation of comparing an induced electromotive force and a common reference,
  implementing the commands of the control device, according to the determined position of the rotor.

According to non-limitative embodiments, the method according to the invention comprises the following additional characteristics:
  synchronous demodulation of the electromotive forces measured,
  comparison of an induced electromotive force with at least one of the elements of the assembly formed by:
    another induced electromotive force,
    a common reference,
    the opposite to another induced electromotive force,
  when a first electromotive force $e_1$ of the first stator winding is greater than a second electromotive force $e_2$ of the second stator winding, then a first signal $C_{1.2}$ equal to 1 is produced, otherwise the first signal $C_{1.2}$ is equal to 0,
  when the second electromotive force $e_2$ of the second stator winding is greater than a third electromotive force $e_3$ of the third stator winding, then a second signal $C_{2.3}$ equal to 1 is produced, otherwise the second signal $C_{20.3}$ is equal to 0,
  when an $(n-1)^{th}$ electromotive force $e_{(n-1)}$ of the $(n-1)^{th}$ stator winding is greater than a last electromotive force $e_n$ of the $(n)^{th}$ stator winding, then an $(n-1)^{th}$ signal $C_{(n-1).(n)}$ equal to 1 is produced, otherwise the $(n-1)^{th}$ signal $C_{(n-1).(n)}$ is equal to 0,
  when the last electromotive force $e_n$ of the $(n)^{th}$ stator winding is greater than the first electromotive force $e_1$ of the first stator winding, then an $n^{th}$ signal $C_{n.1}$ equal to 1 is produced, otherwise the $n^{th}$ signal $C_{n.1}$ is equal to 0,
  determination of the position of the rotor from the value of the n signals $C_{1.2}, C_{2.3}, \ldots, C_{(n-1).(n)}$ and $C_{n.1}$ representing the position of the rotor, according to predefined rules;
  in the case where n is odd and/or the n stator windings are distributed evenly,
    determination of the position of the rotor with a precision of 360/2n degrees electrical;
  in the case where n is even and/or the n stator windings are distributed evenly,
    determination of the position of the rotor with a precision of 360/n degrees electrical;
  in the case where n is odd and/or the n/2 windings form a first system of evenly distributed windings, the n/2 other windings form a second system of evenly distributed windings, the two systems being shifted in phase by 360/(2n) degrees electrical,
    determination of the position of the rotor with a precision of 360/2n degrees electrical;
  comparison of each electromotive force with a reference signal,
  when the first electromotive force $e_1$ of the first stator winding is greater than the reference signal, then an $(n+1)^{th}$ signal $C_{10}$ equal to 1 is produced, otherwise the $(n+1)^{th}$ signal $C_{10}$ is equal to 0,
  when the second electromotive force $e_2$ of the second stator winding is greater than the reference signal, then an $(n+2)^{th}$ signal $C_{20}$ equal to 1 is produced, otherwise the $(n+2)^{th}$ signal $C_{20}$ is equal to 0,
  when the $(n)^{th}$ electromotive force $e_n$ of the last stator winding is greater than the reference signal, then a $(2n)^{th}$ signal $C_{n0}$ equal to 1 is produced, otherwise the $(2n)^{th}$ signal $C_{n0}$ is equal to 0,
  determination of the position of the rotor from the value of the 2n signals $C_{1.2}, C_{2.3}, \ldots, C_{(n-1).(n)}, C_{n.1}, C_{10}, C_{20}, \ldots,$ and $C_{n0}$ representing the position of the rotor, according to predefined rules;
  in a case where n is odd and/or the n stator windings are distributed regularly,
    determination of the position of the rotor with a precision of 360/4n degrees electrical:
  in the case where n is even and/or the n stator windings are distributed regularly, determination of the position of the rotor with a precision of 360/2n degrees electrical;
in the case where n is even and/or n/2 windings form a first system of evenly distributed windings, the n/2 other windings form a second system of evenly distributed windings, the two systems being shifted in phase by 360/(2*n) degrees electrical,
determination of the position of the rotor with a precision of 360/4n degrees electrical;
the 2n signals $C_{1.2}, C_{2.3}, \ldots, C_{(n-1).(n)}, C_{n.1}, C_{10}, C_{20}, \ldots, $ and $C_{n0}$ are rectangular and of the same frequency,
they are obtained by synchronous demodulation;
this synchronous demodulation is a synchronisation defined by a delay relative to a rising edge of the chopper command;
the conversion of the electromotive forces measured digitally,
determination of a control voltage ($U_H$) of the chopper and a duty cycle ratio ($\alpha$) of the chopper,
determination of a first value ($-1/(a.U_H)$) and a second value ($1/((1-a).U_H)$) depending on the control voltage of the chopper and the duty cycle ratio,
when the control voltage of the chopper is positive then each numerical electromotive force is multiplied by the first value, otherwise they are multiplied by the second value,
determination of a position of the rotor from the results of the multiplications, according to predefined rules;
determination of the position of the rotor when the machine is stopped.

The invention also concerns a device for implementing the said method, characterised in that it comprises an electrical machine connected to a control device, the said control device being connected to control logic, the control logic implementing the said method and supplying a position of the rotor.

According to non-limitative embodiments, the device according to the invention comprises the following additional characteristics:
the machine comprises a rotor provided with at least one excitation winding supplied with voltage variable over time by a chopper;
the duty cycle ratio of the chopper belongs to the range [0.01, 0.99].

BRIEF DESCRIPTION OF THE DRAWINGS

The invention will be better understood from a reading of the following description and an examination of the figures that accompany it. These are presented by way of indication and are in no way limitative of the invention. The figures show.

DETAILED DESCRIPTION OF EMBODIMENTS OF THE INVENTION

Figure 1:
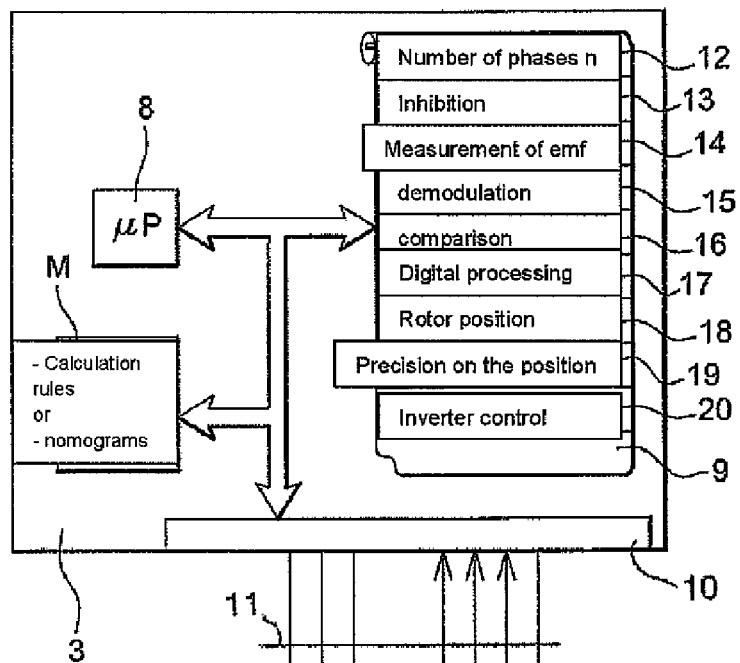
FIG. 1: an illustration of means implementing the method, according to the invention.
Figure 1:
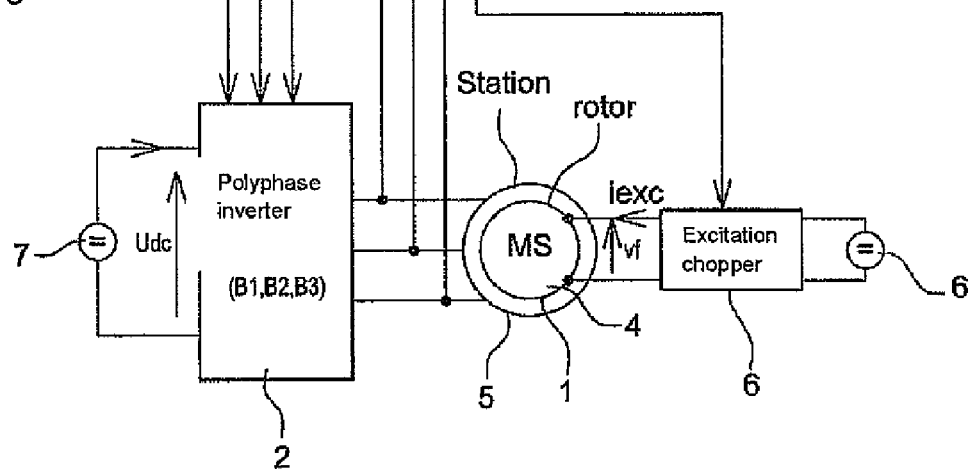

FIG. 1 shows an electrical machine 1 connected to a control device 2 controlled by control logic 3. In the field of electrical machines, three types of machine are known, among which there are essentially:
claw machines with or without magnets,
synchronous machines with projecting poles,
synchronous machines with smooth wound rotor,
hybrid excitation machines whose flux off-load is obtained by an association of excitation windings through which electric currents flow and permanent magnets.

For the rest of the description, the electrical machine 1 is a synchronous machine provided with at least one excitation winding. It may be monophase or polyphase.

The synchronous machine 1 comprises two concentric parts, the rotor 4 and the stator 5. The rotor 4 or field winding is the rotating part and the stator 5 or armature is the fixed part of the synchronous machine. The rotor 4 is provided with at least one excitation winding. The excitation winding of the rotor 4 has an excitation current pass through it delivered, in a preferred example, by a chopper 6. The excitation current of the rotor winding creates a magnetic field.

The chopper 6 makes it possible to chop into a series of periodic rectangles a DC voltage delivered by a DC source 6a. This DC voltage source 6a may be a battery. This periodic chopping of the DC voltage is obtained by means of a static switch (not shown). When the static switch is closed, the DC voltage is applied to the terminals of the winding of the rotor 4. For the rest of the time, the static switch is open and the voltage at the terminals of the winding of the rotor 4 is zero. In a preferred example, the DC voltage is 12 volts. Thus the voltage applied to the excitation winding is variable over time.

In a preferred embodiment, the machine 1 is at rest or at low speed when the winding of the rotor 4 has the excitation current delivered by the chopper 6 passing through it. In this case, the machine behaves as a rotating transformer having the excitation winding of the rotor 4 as its primary and the windings of the stator 5 as the secondary. Thus electromotive forces are induced in the stator windings. These electromotive forces are proportional firstly to an AC voltage delivered by the chopper 6 and secondly to the cosine of the angle that the windings of the stator 5 make with an axis of the winding of the rotor 4.

The stator 5 can be provided with several windings. These stator windings are connected to the control device 2. This control device 2 can in particular be an inverter. In the example in FIG. 1, the control device 2 is a voltage inverter.

The inverter 2 is intended to convert a DC voltage into several sinusoidal voltages, one per stator winding. The inverter 2 is supplied by a DC voltage source 7. This DC voltage source 7 is, in a preferred example, a battery or a rectified network.

The inverter 2 comprises several bridge arms (not shown). Each bridge arm consists of several electronically controllable switches. The mid-point of each pair of switches on the same bridge arm of the inverter 2 is connected to a winding of the stator 5.

The inverter 2 is controlled in full wave mode or pulse width modulation mode, normally referred to as PWM, or PWM in English, by the control logic 3. To control a polyphase inverter, the control logic 3 defines the open or closed state of all the switches of the inverter 2.

In the example in FIG. 1, the inverter 2 is a dual-level three-phase inverter, though it can be replaced by other existing types of inverter. The inverter 2 therefore comprises three bridge arms.

The control logic 3 is often produced in the form of integrated circuits. In one example, this control logic 3 comprises a microprocessor 8, a program memory 9, a calculation memory M and an input/output interface 10. The microprocessor 8, the memory 9, the memory M and the input/output interface 10 are interconnected by a communication bus 11. The calculation memory M comprises calculation rules or nomograms for determining the position of the rotor.

In practice, when an action is accorded to a device, this is performed by a microprocessor of the device controlled by instruction codes recorded in a program memory of the device. The control logic 3 is such a device.

The program memory 9 is divided into several areas, each area corresponding to instruction codes for performing a function of the device. The memory 9 comprises an area 12 comprising instruction codes for determining the number n of stator windings. This number n is an integer number. The memory 9 comprises an area 13 comprising instruction codes for controlling the inhibition of the control of the inverter. The memory 9 comprises an area 14 containing instruction codes for making measurements of the electromotive forces induced on the stator windings and the transmission of these measurements to the control logic 3.

The memory 9 comprises an area 15 containing instruction codes for performing a synchronous or asynchronous demodulation of the electromotive forces induced. The memory 9 comprises an area 16 containing instruction codes for performing either a comparison of the electromotive forces with each other or a comparison of the electromotive forces with reference values in order to determine a belonging range for the position of the rotor, or for making a comparison of the electromotive forces with a reference signal, for example a zero signal. In a variant, the comparison area 16 can be effected before the demodulation area 15.

The memory 9 comprises an area 17 containing instruction codes for performing a digital processing of the measurements of the electromotive forces induced. The memory 9 comprises an area 18 containing instruction codes for determining a position of the rotor according to the results supplied by the areas 16 or 17 associated with calculation rules or with nomograms previously defined and recorded in the memory M. The memory 9 comprises an area 19 containing instruction codes for calculating a precision of the position of the rotor. This precision depends on the parity of the number n of stator windings and the distribution of the said windings. The memory 9 comprises an area 20 containing instruction codes for determining a command for the inverter from the position of the rotor determined by virtue of the instruction codes of the area 18.

Figure 2:
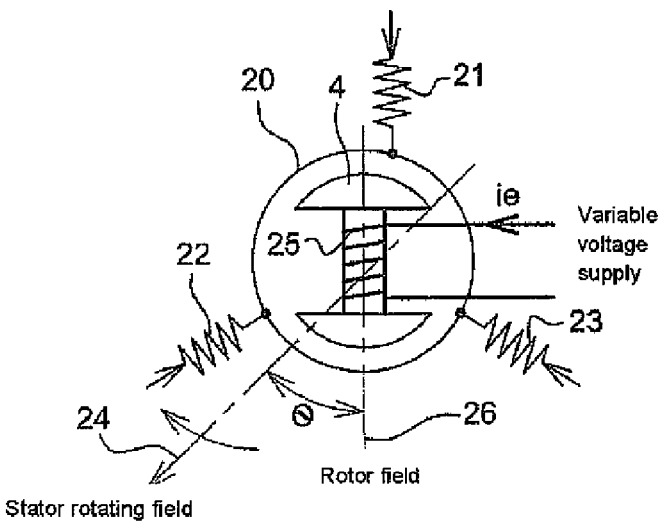
FIG. 2: a schematic representation of a rotor and stator of a three-phase machine.

FIG. 2 shows a schematic representation of a rotor and stator, in the case of a three-phase machine. The machine comprises an air gap 20 situated between the rotor and the stator. The stator can be mounted either in a delta or star with or without neutral. The stator can comprise a plurality of fixed windings. Likewise the rotor can comprise a plurality of poles.

In the example in FIG. 2, the stator comprises a first stator winding 21, a second stator winding 22 and a third stator winding 23. The three windings 21 to 23 of the stator are distributed in an even manner in space. Even distribution means a uniform angle between the various stator windings of the machine. The currents supplying the windings 21 to 23 of the stator have the same effective value.

These stator currents create a magnetic field 24 turning in the stator. This turning stator field 24 is synchronous with the frequency of the stator currents. The stator field turns at the electrical angular frequency of the rotor. When the rotor is stopped the stator field is immobile.

In the example in FIG. 2, the rotor is bipolar. It comprises two poles, a north pole and a south pole. The rotor can also be multipolar. The stator has the same number of pairs of poles as the rotor. The rotor comprises a winding 25 centred on the fixed windings 21 to 23 of the stator. The winding 25 of the rotor is supplied by an excitation current making it similar to a magnet, causing a creation of a rotor magnetic field 26. This rotor magnetic field 26 thus created continuously seeks to align itself on that of the stator. This rotor magnetic field 26 turns at the same speed as the stator field 24.

The stator windings of the armature or stator are subjected to the rotation magnetic field of the air gap, causing the creation of electromotive forces. The induced electromotive force is the voltage produced by the variation in the magnetic flux through the stator. The stator windings are disposed in the stator so that the electromotive force is sinusoidal in form.

In the case of a three-phase machine, in star or delta, each winding has an induced electromotive force of the same effective value and shifted in phase by 120 degrees.

The machines comprising a multipole rotor amount to a machine comprising a bipolar rotor at the cost of angular transformation.

Figure 3:
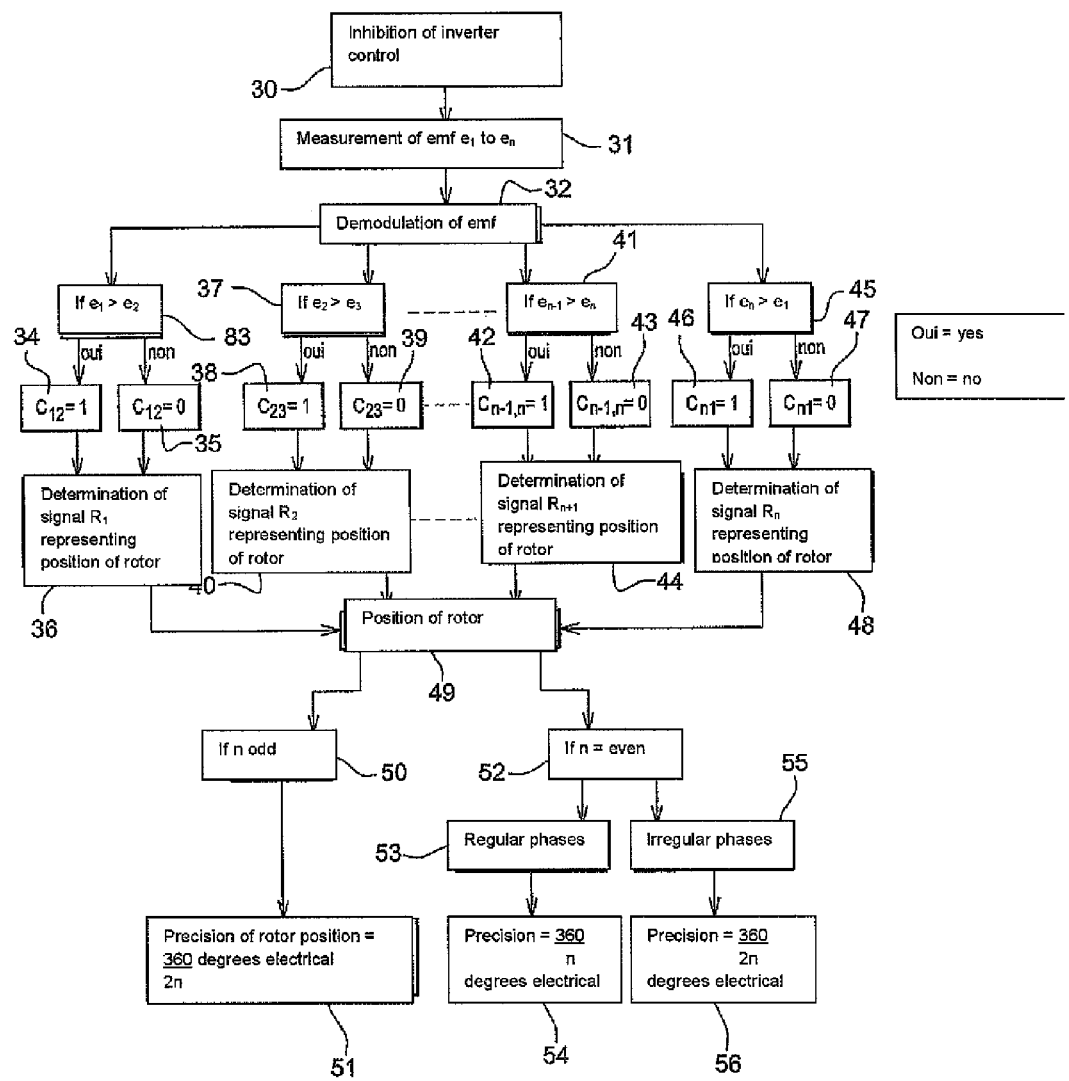
FIG. 3: an illustration of the steps, in a first embodiment, of the method according to the invention.

FIG. 3 shows a method, according to the invention, of a first functioning mode of the means illustrated in FIG. 1. FIG. 3 shows a preliminary step 30 in which the commands for the inverter are entirely inhibited, in order not to short-circuit the windings of the stator and falsify the measurements of the induced electromotive forces.

After inhibition of the inverter commands, the control logic demands the excitation of the field winding of the rotor with a chopping period very much less than the rotor time constant. This excitation induces electromotive forces of the same frequency at the stator terminals. The relative amplitude of these electromotive forces depends on the position of the rotor.

At step 31, the control logic makes measurements of the electromotive forces. During these measurements, the rotor is preferably stopped or rotating very slowly.

For each stator winding, the control logic measures an induced electromotive force by means, for example, of a voltage sensor. For the first stator winding the control logic measures a first electromotive force $e_1$. For the second stator winding it measures a second electromotive force $e_2$ and so on until the last stator winding, where it measures the $n^{th}$ electromotive force $e_n$. These notations will be kept for the rest of the description.

When the measurements of the induced electromotive forces $e_1$ to $e_n$ are made according to a neutral point or any reference then a simple induced electromotive force is spoken of. When the measurements of the induced electromotive forces $e_1$ to $e_n$ are completely differential without recourse to a neutral point or to any reference point then a composed induced electromotive force is spoken of.

Whether the electromotive forces be simple or composed, the result obtained is the same. The expressions of these induced electromotive forces are as follows:

$$e_1 = k \cdot v_f(t) \cdot \cos(\theta - \theta_1)$$

$$e_2 = k \cdot v_f(t) \cdot \cos(\theta - \theta_2)$$

$$e_n = k \cdot v_f(t) \cdot \cos(\theta - \theta_n)$$

where $v_f(t)$ is the alternating component of the excitation voltage, $\theta$ a position of the rotor with respect to a given reference, $\theta 1, \theta 2 \ldots \theta n$ are the positions of the n stator windings with respect to the same reference and k is a constant related to the parameters of the machine. The amplitude of these induced electromotive forces is modulated by the cosine of the position of the rotor.

At step 32, the control logic effects a demodulation of the induced electromotive forces $e_1$ to $e_n$ measured and acquired by the control logic.

This demodulation is preferably synchronous. It makes it possible to extract a useful signal embedded in the noise. This principal applies generally to signals of very low amplitudes. Synchronous demodulation is a means of minimising the influence of the noise on the signal.

In the example in FIG. 3, the electromotive forces are demodulated by the voltage $v_f(t)$. This synchronous demodulation is a sampling of the electromotive forces $e_1$, $e_2$ to $e_n$ at instants having a fixed delay with respect to the switching instants of the voltage $v_f$. This synchronous demodulation makes it possible to obtain sinusoidal signals changing according to the position of the rotor.

In a variant, the control logic can effect an asynchronous demodulation based on the extraction from the envelope of the induced electromotive forces using a peak detector.

Steps 33 to 48 show the various steps of comparisons of the induced electromotive forces in order to determine a belonging range of the position angle of the rotor. These comparison steps can comprises at least one of the elements of the set formed by:
- comparison of one electromotive force with another electromotive force,
- comparison of one electromotive force with a common reference,
- comparison of one electromotive force with the opposite of another induced electromotive force.

In the example in FIG. 3, steps 33 to 48 make a comparison of each electromotive force with another electromotive force. The results of these comparisons are synchronous with the excitation signal since the measurements of the electromotive forces are synchronised on the rising edges of the control signal of the chopper. In a variant, the control logic can compare the induced electromotive forces with reference values.

In a variant the control logic can first of all perform the comparison steps 33 to 48 before performing the demodulation step 32.

The functioning of these comparison steps 33 to 48 is illustrated in FIG. 3 for n equals 3.

At step 33, the control logic compares the first electromotive force $e_1$ with the second electromotive force $e_2$. When the first electromotive force $e_1$ is greater than the second electromotive force $e_2$ then the control logic applies step 34, otherwise it applies step 35.

At step 34; the control logic produces a first signal $C_{12}$, preferably binary, the amplitude of which is equal to 1. At step 35, the signal $C_{12}$ has a zero amplitude. From the first signal $C_{12}$ obtained at step 34 or 35, the control logic determines, at step 36, a first signal $R_1$ representing the position of the rotor.

At step 37, the control logic compares the second electromotive force $e_2$ with the third electromotive force $e_3$. When the second electromotive force $e_2$ is greater than the third electromotive force $e_3$ then the control logic applies step 38, otherwise it applies step 39.

At step 38, the control logic produces a second signal $C_{23}$, preferably binary, the amplitude of which is equal to 1. At step 39, the signal $C_{23}$ has a zero amplitude.

From the second signal $C_{23}$ obtained at step 38 or 39, the control logic determines, at step 40, a second signal $R_2$ representing the position of the rotor. And so on up to the $n^{th}$ electromotive force $e_n$.

At step 41, the control logic compares the $(n-1)^{th}$ electromotive force $e_{n-1}$ with the last electromotive force $e_n$. When the $(n-1)^{th}$ electromotive force $e_{n-1}$ is greater than the $n^{th}$ electromotive force $e_n$, then the control logic applies step 42, otherwise it applies step 43.

At step 42, the control logic produces an $(n-1)^{th}$ signal $C_{(n-1)(n)}$, preferably binary, the amplitude of which is equal 1. At step 43, the signal r $C_{(n-1)(n)}$ has a zero amplitude.

From the $(n-1)^{th}$ signal $C_{(n-1)(n)}$ obtained at step 42 or 43, the control logic determines at step 44 an $(n-1)^{th}$ signal $R_{n-1}$ representing the position of the rotor.

At step 45, the control logic compares the $n^{th}$ electromotive force $e_n$ with the first electromotive force $e_1$. When the $n^{th}$ electromotive force $e_n$ is greater than the first electromotive force $e_1$ then the control logic applies step 46, otherwise it applies step 47.

At step 46, the control logic produces an $n^{th}$ signal $C_{n1}$, preferably binary, the amplitude of which is equal to 1. At step 47, the signal $C_{n1}$ has zero amplitude.

From the $n^{th}$ signal $C_{n1}$ obtained at step 46 or 47, the control logic determines at step 48 an $n^{th}$ signal $R_n$ representing the position of the rotor.

As soon as the n signals $R_1, R_2, \ldots, R_{n-1}, R_n$ representing the position of the rotor, are obtained respectively at steps 36, 40, 44 and 48, the control logic applies step 49.

In this step 49, the control logic determines the position of the rotor according to the n binary signals $R_1, R_2, \ldots, R_{n-1}, R_n$ representing the position of the rotor associated with calculation rules or nomograms contained in the calculation memory. The control logic codes the n binary signals $R_1, R_2, \ldots, R_{n-1}, R_n$ in decimal over an electrical period so that $R_1$ is the least significant bit and $R_n$ the most significant bit. Consequently the control logic characterises the position of the rotor by levels that may range from 1 to n or from 1 to 2n according to the parity of n.

When n is odd, the control logic applies steps 50, 51 in order to calculate the precision of the position of the rotor determined. When n is even, the control logic applies steps 53, 56 in order to calculate the precision of the position of the rotor determined.

At step 51, the position of the rotor is determined with a precision equal to 360/2n degrees electrical.

When n is even and the windings of the stator are evenly distributed in space, then the control logic at step 54 calculates the precision of the position of the rotor. This precision is equal to 360/n degrees electrical.

When n is even and the stator windings are irregularly distributed in space, then the control logic at step 56 calculates the precision of the position of the rotor. This precision is equal to 360/2n degrees electrical.

This first embodiment of the invention, described above, is illustrated in FIGS. 5, 6 and 7, in the case of a three-phase machine. This first embodiment makes it possible to obtain the same result as the Hall effect or optical position sensors of the prior art for the same three-phase machine.

Figure 4:
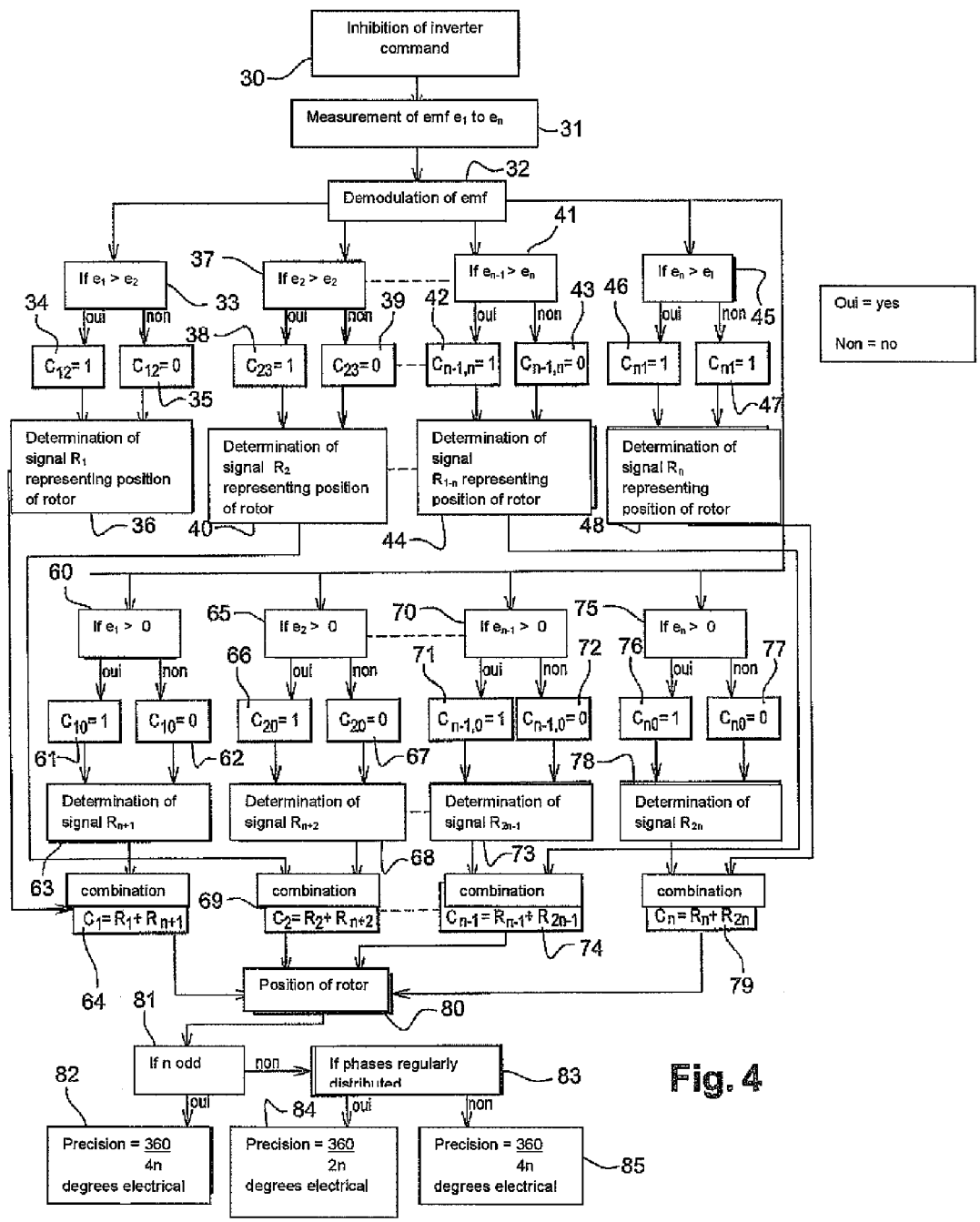
FIG. 4: an illustration of the steps, in a second embodiment, of the method according to the invention.

FIG. 4 shows a method according to the invention of a second operating mode of the means illustrated in FIG. 1. FIG. 4 comprises the same steps 30 to 48 of FIG. 3.

Figure 8:
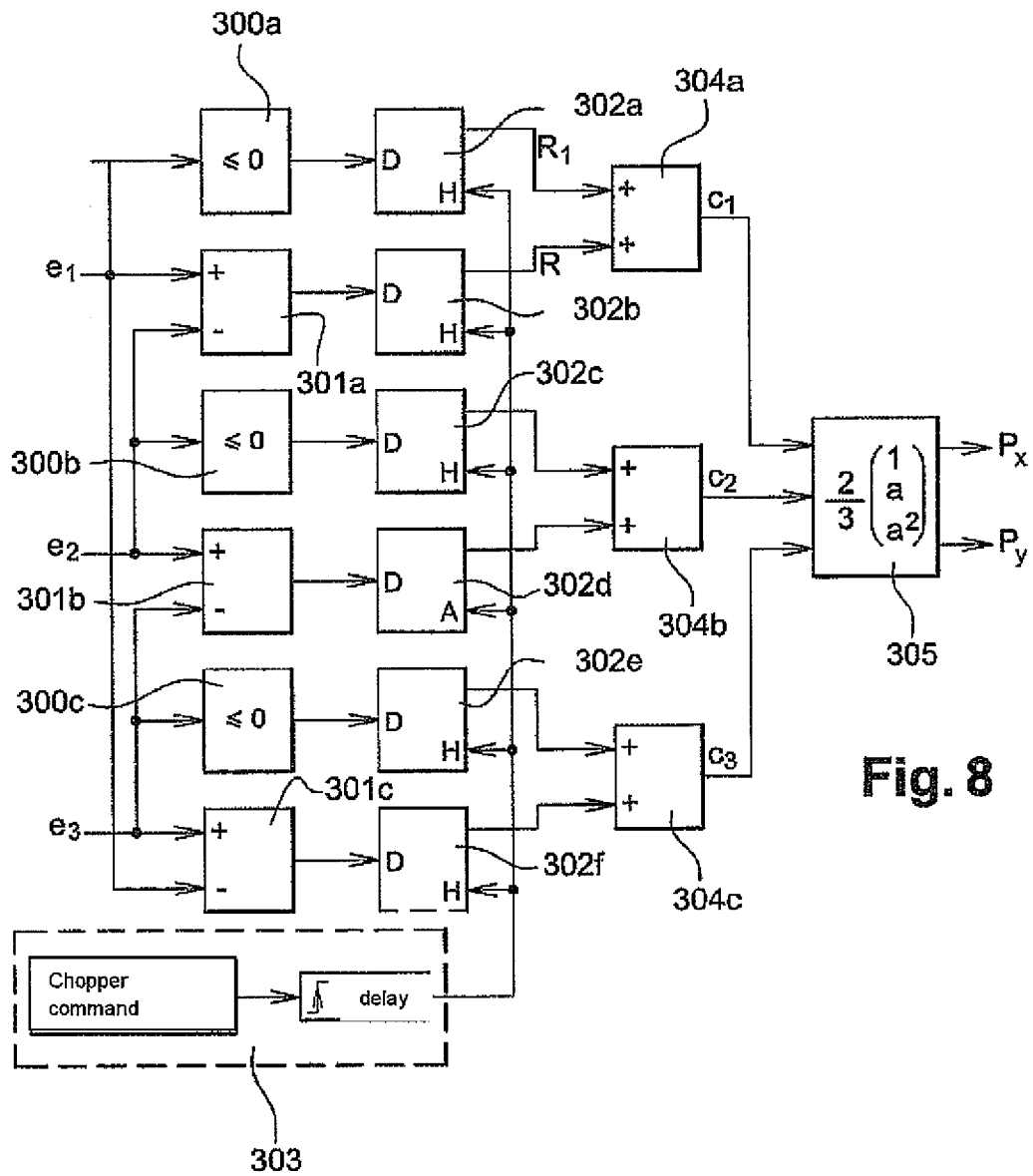
FIG. 8: an illustration of means implementing the second embodiment of the invention, in the case of a three-phase machine.

Steps 60 to 75 show the various steps of comparisons of each induced electromotive force with a reference signal. In a preferred example, this reference signal is a zero signal. The functioning of these comparison steps 60 to 75 is illustrated in FIG. 8.

At step 60, the control logic compares the first electromotive force $e_1$ with a zero signal. When the first electromotive force $e_1$ is greater than the zero signal then the control logic applies step 61, otherwise it applies step 62.

At step 61, the control logic produces an $(n+1)^{th}$ signal $C_{10}$, preferably binary, the amplitude of which is equal to 1. At step 62, the signal $C_{10}$ has a zero amplitude.

From the $(n+1)^{th}$ signal $C_{10}$ obtained at step 61 or 62, the control logic at step 63 determines an $(n+1)^{th}$ signal $R_{n+1}$ representing the position of the rotor.

At step 64, the control logic makes a first comparison $C_1$ of the first signal $R_1$ and the $(n+1)^{th}$ signal $R_{n+1}$ representing the position of the rotor. This combination can be implemented by an addition or a subtraction. In a preferred example, this combination is an addition.

At step 65, the control logic compares the second electromotive force $e_2$ with a zero signal. When the second electromotive force $e_2$ is greater than the zero signal then the control logic applies step 66, otherwise it applies step 67.

At step 66, the control logic produces an $(n+2)^{th}$ signal $C_{20}$, preferably binary, the amplitude of which is equal to 1. At step 67, the signal $C_{20}$ has a zero amplitude.

From the $(n+2)^{th}$ signal $C_{20}$ obtained at step 66 or 67, the control logic at step 68 determines an $(n+2)^{th}$ signal $R_{n+2}$ representing the position of the rotor.

At step 69 the control logic makes a second comparison $C_2$ of the second signal $R_2$ and the $(n+2)^{th}$ signal $R_{n+2}$ representing the position of the rotor.

And so on up to the $n^{th}$ electromotive force $e_n$.

At step 70, the control logic compares the $(n-1)^{th}$ electromotive force $e_{n-1}$ with a zero signal. When the $(n-1)^{th}$ electromotive force $e_{n-1}$ is greater than the zero signal then the control logic applies step 71, otherwise it applies step 72.

At step 71, the control logic produces a $(2n-1)^{th}$ signal $C_{(n-1)0}$, preferably binary, the amplitude of which is equal to 1. At step 72, the signal $C_{n-10}$ has a zero amplitude.

From the $(2n-1)^{th}$ signal $C_{n-10}$ obtained at step 71 or 72, the control logic at step 73 determines a $(2n-1)^{th}$ signal $R_{2n-1}$ representing the position of the rotor.

At step 74, the control logic makes a $(n-1)^{th}$ comparison $C_{n-1}$ of the $(n-1)^{th}$ signal $R_{n-1}$ and the $(2n-1)^{th}$ signal $R_{2n-1}$ representing the position of the rotor.

At step 75, the control logic compares the $n^{th}$ electromotive force $e_n$ with a zero signal. When the $n^{th}$ electromotive force $e_n$ is greater than the zero signal then the control logic applies step 76, otherwise it applies step 77.

At step 76, the control logic produces a $(2n)^{th}$ signal $C_{n0}$, preferably binary, the amplitude of which is equal to 1. At step 77, the signal $C_{n0}$ has a zero amplitude.

From the $(2n)^{th}$ signal $C_{n0}$ obtained at step 76 or 77, the control logic at step 78 determines a $(2n)^{th}$ signal $R_{2n}$ representing the position of the rotor.

A step 79, the control logic makes an $n^{th}$ combination $C_n$ of the $n^{th}$ signal $R_n$ and the $(2n)^{th}$ signal $R_{2n}$ representing the position of the rotor.

As soon as the n combinations $C_1, C_2 \ldots C_{n-1}$ and $C_n$ of the signals representing the position of the rotor are obtained the control logic applies step 80. In this step 80, the control logic determines the position of the rotor, associating with the combinations $C_1, C_2 \ldots C_{n-1}$ and $C_n$ the calculation rules or nomograms previously defined in the memory M.

Consequently the control logic characterises the position of the rotor by levels that may range from 1 to 2n or from 1 to 4n according to the parity of n.

At step 81, if n is odd, the control logic applies step 82, otherwise it applies step 83. At step 81, the precision of the position of the rotor determined is equal to 360/4n degrees electrical. At step 83, as n is even, the control logic determines whether the n windings of the stator are distributed evenly in space. If such is the case, it calculates at step 84 the precision of the position of the rotor determined which is equal to 360/2n degrees electrical. Otherwise it determines at step 85 the position of the rotor with a precision of 360/4n degrees electrical.

This second embodiment of the invention, described above, is illustrated in FIGS. 8, 9 and 10. This second embodiment makes it possible to refine the resolution of the position of the rotor without for all that increasing the cost.

Figure 11A:
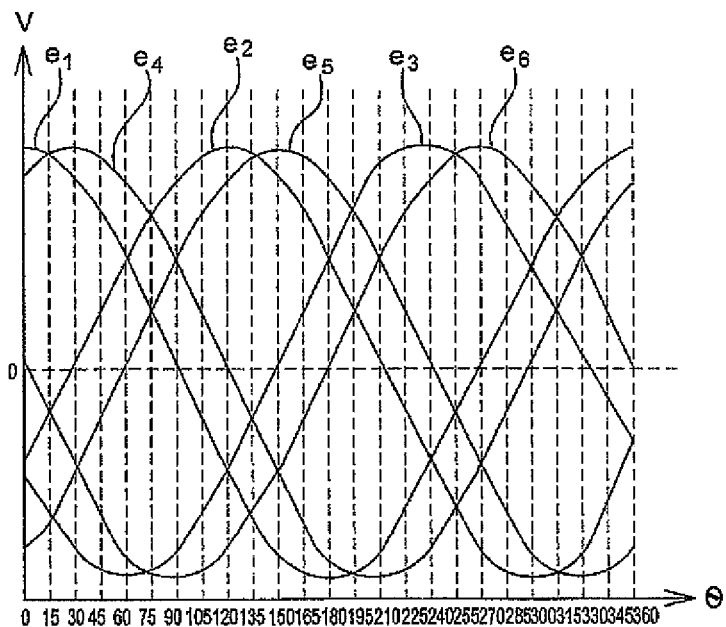
FIG. 11: a graphical representation of the first and second embodiments of the invention in the case of a machine comprising six phases.
Figure 11B:
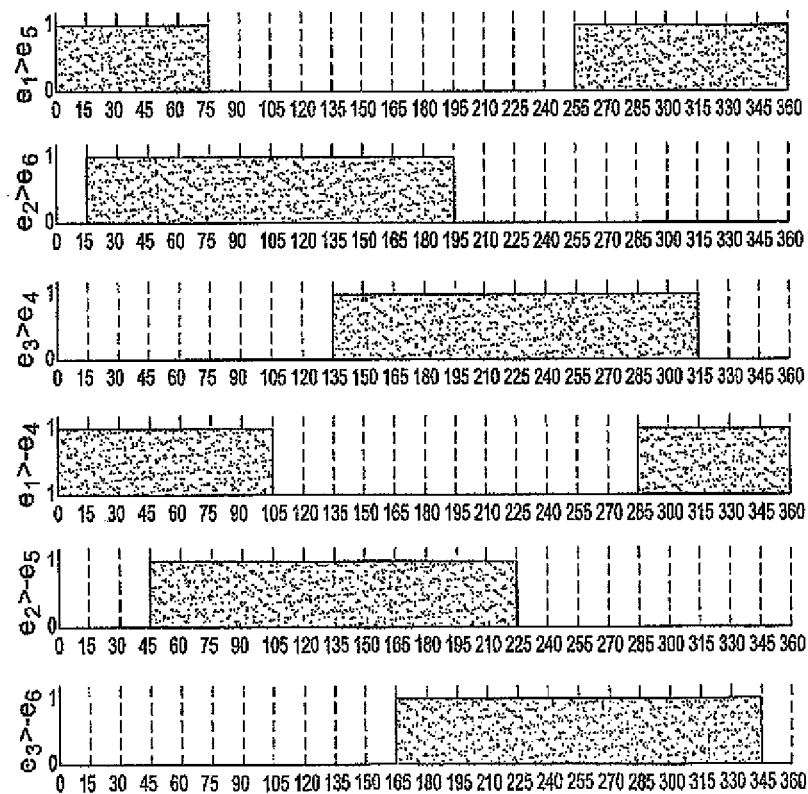
Figure 11C:
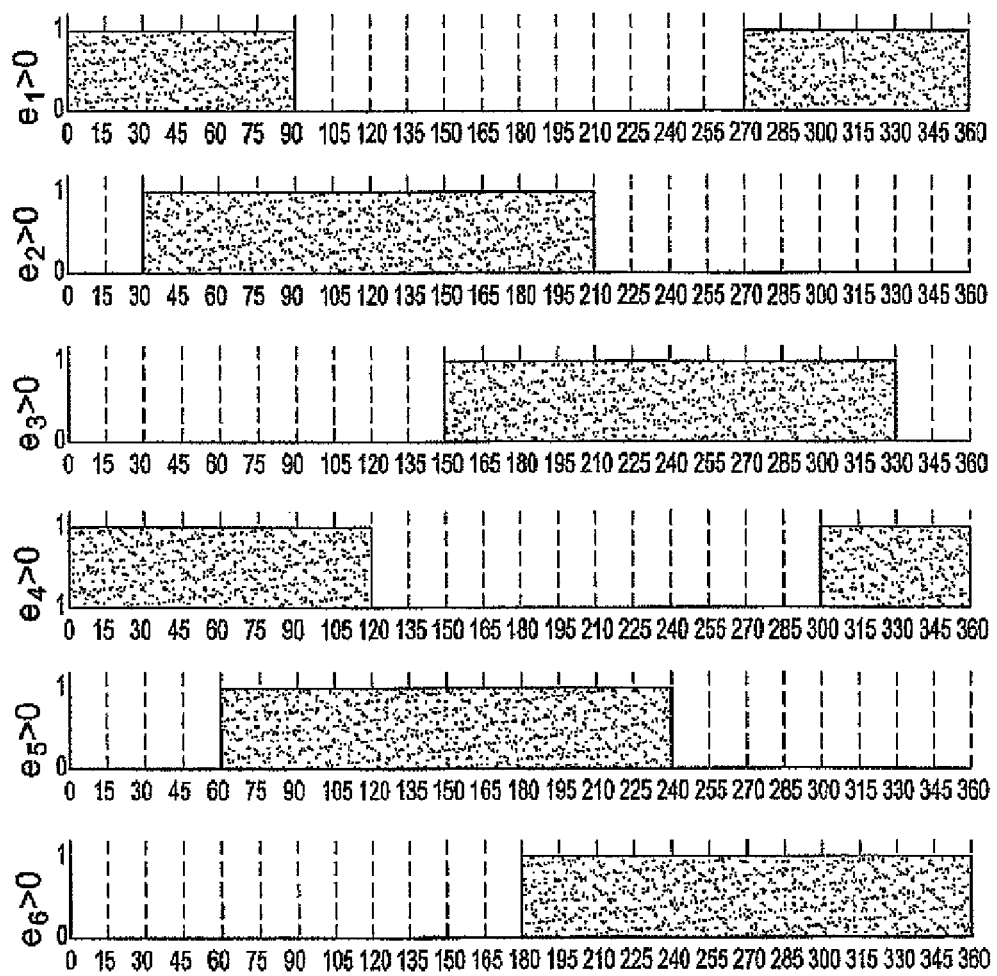
Figure 12:
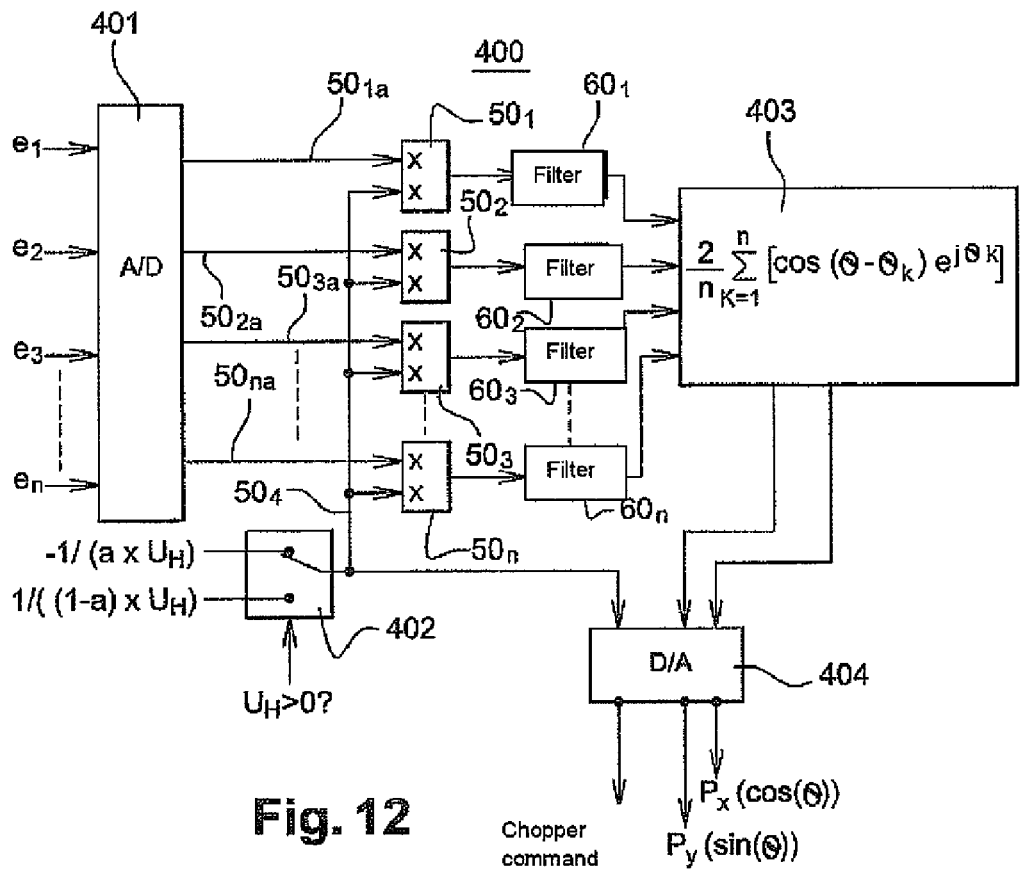
FIG. 12: an illustration of means implementing a third embodiment of the invention.

A third embodiment of the invention is described in FIGS. 11 and 12.

Figure 5:
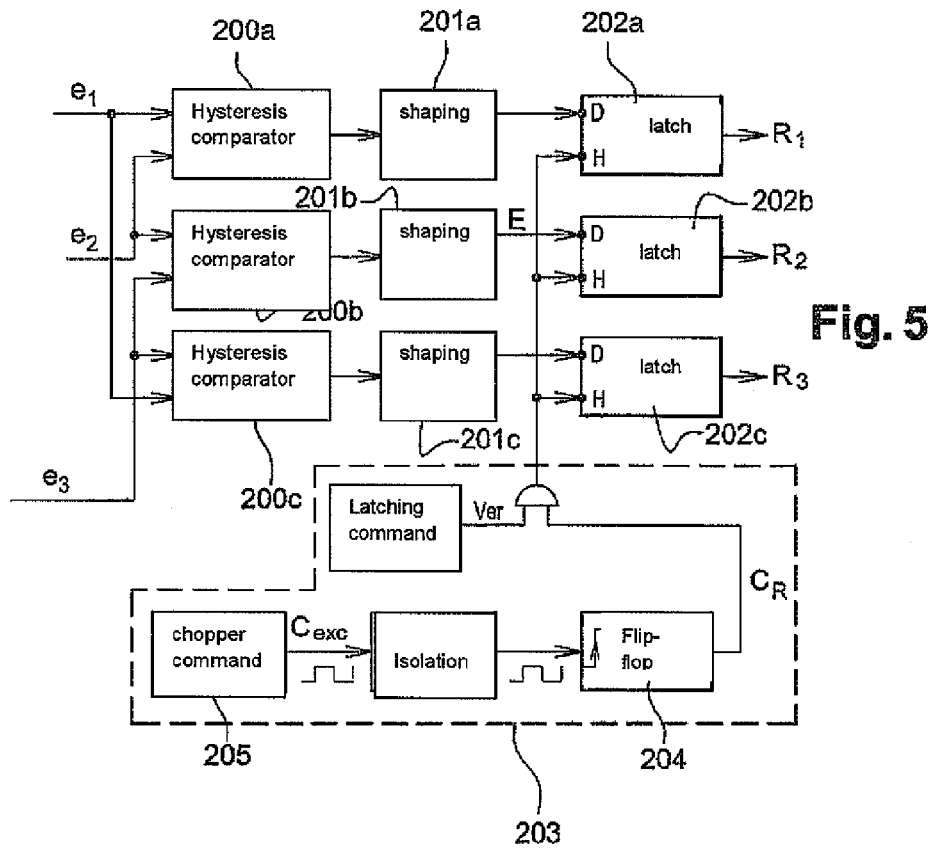
FIG. 5: an illustration of means implementing the first embodiment of the invention, in the case of a three-phase machine.

FIG. 5 shows means implementing the method of the first embodiment of the invention, in FIG. 3. In the example in FIG. 5, n is equal to 3. The electrical machine is a three-phase machine. After any amplification, the electromotive forces induced are compared with each other in order to result in three rectangular signals with the same frequency.

To make this comparison, the electromotive forces are sent in pairs to a hysteresis comparator 200a. The control logic comprises as many hysteresis comparators 200a as there are comparisons to be made. This hysteresis comparator is preferably an operational amplifier functioning in switching mode. The output state of the comparator defines whether an electromotive force is greater or less than another electromotive force.

The first hysteresis comparator 200a compares the first electromotive force $e_1$ with the second electromotive force $e_2$. The second hysteresis comparator 200b compares the second electromotive force $e_2$ with the third electromotive force $e_3$. The third hysteresis comparator 200c compares the third electromotive force $e_3$ with the first electromotive force $e_1$.

The output signal of each comparator 200a, 200b and 200c is sent respectively to a shaping circuit 201a, 201b and 201c. These shaping circuits 201a, 201b and 201c make it possible to adapt the output signal of the comparators so that it can be correctly interpreted by the input of a flip-flop.

In the example in FIG. 5, the shaping circuits 201a, 201b and 201c each produce a binary signal having a high state and a low state, from the output signal of the hysteresis comparators. Thus the shaping circuits 201a, 201b and 210c supply at the output three rectangular signals with the same frequency.

The binary signal delivered by each shaping circuit 201a, 201b and 201c is respectively sent to flip-flops 202a, 202b and 202c. The flip-flops 202a, 202b and 202c are sequential gates for storing a bit. Thus the state of the output of these flip-flops depends on its inputs but also on the value that it contains. In one embodiment, these flip-flops are D flip-flops. They may also be any other circuit making it possible to fulfil a storage function.

The D flip-flop comprises two inputs, an input D corresponding to the signal produced by the shaping circuit and an input H corresponding to the clock signal supplied by a unit 203. This clock signal is produced from a delay on the rising edges of the chopper command. The D flip-flop comprises an output supplying the signals representing the position of the rotor. At each clock rising edge, the output copies the input value D, and at each clock falling edge, the value of the input copied is stored, in this case the flip-flop is latched. The D flip-flop thus makes it possible to obtain the signals representing the position of the rotor by synchronisation of a delay at the rising edges of the chopper control signal.

In a variant a Reset signal can be put in place in order to initialise an initial value of the flip-flop, on powering up.

The unit 203 supplies the clock signal to the flip-flops 202a, 202b and 202c. To do this, the unit 203 has a monostable 204. The monostable 204 is a flip-flop having a stable state and an unstable state. It can pass from one of these states to the other under the action of a command from the chopper 205. The monostable 205 is used to make time delays.

With the clock signal, the signals issuing from the comparison are synchronous with the excitation signal and periodic at the chopping frequency. With a view to extracting useful information on the position of the rotor, the control logic samples the amplitudes of the signals issuing from the shaping circuits at instants slightly delayed with respect to the rising edges of the excitation signal. The result of this sampling leads to the production of three signals $R_1$, $R_2$ and $R_3$ representing the position of the rotor at intervals of 360/(2×3) degrees electrical, equal to 60° electrical.

Figure 6:
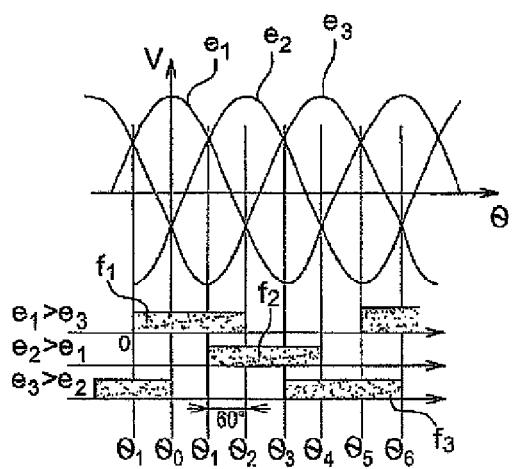
FIG. 6: a graphical representation of the first embodiment of the invention in the case of three-phase machine.

FIG. 6 shows in a graph the trend of the three demodulated electromotive forces as well as the trend of the results of the comparisons with each other. The y axis represents the amplitude of the signal in volts. The x axis represents the angular position of the rotor. The curve $e_1$ shows the trend of the first demodulated electromotive force $e_1$. The curve e2 shows the trend of the second demodulated electromotive force $e_2$ shifted in phase by $2\pi/3$ with respect to the curve of the first demodulated electromotive force $e_1$. The curve e3 shows the trend of the third electromotive force $e_3$ demodulated and shifted in phase $2\pi/3$ with respect to the curve of the second demodulated electromotive force $e_2$.

FIG. 6 also shows the binary representations of the results of the comparison in pairs of the electromotive forces. The curve f1 represents the binary result of the comparison of the curves e1 and e3. The curve f2 represents the binary result of the comparison of the curves e2 and e1. The curve f3 represents the binary result of the comparison of the curves e3 and e2. The binary result comprises a high state equal to 1 and a low state equal to 0.

In the interval −θ1 to θ0, the curve e1 being greater than the curve e3, means that the curve f1 is at the high state. The curve e2 being less than the curve e1 means that the curve f2 is at the low state. The curve e3 being greater than the curve e2 means that the curve f3 is at the high state. In this case, the first signal $R_1$ is at the high state, the second signal $R_2$ is at the low state as is the third signal $R_3$.

In the interval θ0 to θ1, the curve e3 becomes less than the curve e2, giving rise to a change in state in the curve f3. The curve f3 goes to the low state. In this case, the first signal $R_1$ is at the high state, as is the second signal $R_2$, and the third signal $R_3$ is at the low state.

In the interval θ1 to θ2 the curve e2 becomes higher than the curve e1, giving rise to a change in state in the curve f2. The curve f2 goes to the high state. In this case, the first signal $R_1$ is at the low state, as is the third signal $R_3$, and the second signal $R_2$ is at the high state.

In the interval θ2 to θ3 the curve e1 becomes lower than the curve e3, giving rise to a change in state of the curve f1. The curve f1 goes to the low state. In this case, the first signal $R_1$ is at the low state, the second signal $R_2$ is at the high state, as is the third signal $R_3$.

In the interval θ3 to θ4 the curve e3 becomes higher than the curve e2, giving rise to a change in state in the curve f3. The curve f3 goes to the high state. In this case, the first signal $R_1$ is at the low state, as is the second signal $R_2$, and the third signal $R_3$ is at the high state.

In the interval θ4 to θ5 the curve e2 becomes lower than the curve e1, giving rise to a change in state in the curve f2. The curve f2 goes to the low state. In this case, the first signal $R_1$ is at the high state, as is the third signal $R_3$, and the second signal $R_2$ is at the low state.

In the interval θ5 to θ6 the curve e1 becomes higher than the curve e3, giving rise to a change in state in the curve f1. The curve f1 goes to the high state. In this case, the first signal $R_1$ is at the high state, and the second signal $R_2$ is at the low state, as is the third signal $R_3$.

In the interval θ6 to θ7 the curve e3 becomes lower than the curve e2, giving rise to a change in state in the curve f3. The curve f3 goes to the low state. In this case, the first signal $R_1$ is at the high state, as is the second signal $R_2$, and the third signal $R_3$ is at the low state.

The results of these comparisons are shifted in phase by 360/(2×3) degrees electrical. These results are then obtained with a precision of 60 degrees electrical. Physically, it is not possible to obtain at the same time the three signals $R_1$, $R_2$ and $R_3$ representing the position of the rotor at the high state or at the low state.

Figure 7:
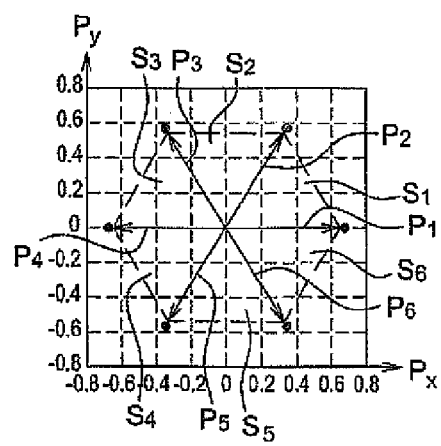
FIG. 7: a representation of the vectorial positions of the rotor at rest or at low speed with the first embodiment according to the invention, in the case of a three-phase machine.

FIG. 7 shows the position of a position vector of the rotor produced from three signals $R_1$, $R_2$ and $R_3$ representing the position of the rotor. This position vector is obtained in accordance with the following equation:

$$\vec{P(\theta)} = \frac{2}{3}\{R_1 + aR_2 + a^2 R_3\}$$

$$\text{where } a = e^{j\frac{2\pi}{3}}$$

This position vector is represented on the y axis by the component $p_y$ and on the x axis by the component $p_x$. It occupies successively the six vertices of a hexagon at regular angular intervals of 60 degrees electrical. On the machine comprising a bipolar rotor, the various position vectors $\vec{P1}$ to $\vec{P6}$ show six angular sectors S1 to S6 representing the various possible comparisons between the electromotive forces induced by the excitation of the rotor winding.

Each angular sector has its vertex at the centre of the hexagon and forms an angle of 60 degrees electrical. Each of the position vectors forms with the consecutive position vector an angular sector. The first angular sector S1 is formed by the position vectors $\vec{P1}$ and $\vec{P2}$ and so on up to the sixth angular sector S1, which is formed by the position vectors $\vec{P6}$ and $\vec{P1}$.

FIG. 8 shows means implementing the method of the second embodiment of the invention, of FIG. 4, for the same three-phase machine as in the examples in FIGS. 5, 6 and 7. FIG. 8 shows a block diagram of the comparison of the electromotive forces with each other as well as the passage to zero of these electromotive forces.

The control logic makes, as in the first embodiment, a first comparison corresponding to the comparison of each electromotive force with another electromotive force. This first comparison is made by comparators 301a, 301b and 301c.

The control logic makes a second comparison corresponding to the comparison of each electromotive force with a zero signal. This second comparison is made by comparators 300a, 300b and 300c.

The comparator 300a compares the first electromotive force $e_1$ with a zero signal. The comparator 300b compares the second electromotive force $e_2$ with a zero signal. The comparator 300c compares the third electromotive force $e_3$ with a zero signal. The comparator 301a compares the first electromotive force $e_1$ with the second electromotive force $e_2$. The comparator 301b compares the second electromotive force $e_2$ with the third electromotive force $e_3$. The comparator 301c compares the third electromotive force $e_3$ with the first electromotive force $e_1$.

The output of each comparator is sent to a flip-flop, preferably a D flip-flop, the clock signal of which is supplied by a unit 303. The flip-flop 302a receives the result of the comparison from the comparator 300a and supplies a fourth signal $R_4$ representing the position of the rotor. The flip-flop 302b receives the result of the comparison of the comparator 301a and supplies the first signal $R_1$ representing the position of the rotor.

The flip-flop 302c receives the result of the comparison from the comparator 300b and supplies a fifth signal $R_5$ representing the position of the rotor. The flip-flop 302d received the result of the comparison from the comparator 301b and supplies the second signal $R_2$ representing the position of the rotor.

The flip-flop 302e receives the result of the comparison from the comparator 300c and supplies a sixth signal $R_6$ representing the position of the rotor. The flip-flop 302f receives the result of the comparison of the comparator 301c and supplies the third signal $R_3$ representing the position of the rotor.

In other words, the flip-flops having as an input the result of the comparison of the electromotive forces with each other supply three signals $R_1$, $R_2$ and $R_3$ representing the position of the rotor. The flip-flops having as an input the result of the comparison of each electromotive force with the zero signal supply three other signals $R_4$, $R_5$ and $R_6$ representing the position of the rotor.

To take advantage of the phase difference between the signals $R_1$, $R_2$, $R_3$ and $R_4$, $R_5$, $R_6$ the control logic combines these signals. This combination is preferably carried out by an adder. The adder 304a receives the first signal $R_1$ and the fourth signal $R_4$ representing the position of the rotor, and supplies a first combination $C_1$ as an output. The adder 304b receives the second signal $R_2$ and the fifth signal $R_5$ representing the position of the rotor, and supplies a second combination $C_2$ as an output. The adder 304c receives the third signal $R_3$ and the sixth signal $R_6$ representing the position of the rotor, and supplies a third combination $C_3$ as an output. These three combination signals $C_1$, $C_2$ and $C_3$ are transmitted to a computer 305. This computer 305 determines the position vector of the rotor from the nomograms or calculation rules contained in the calculation memory M. It supplies as an output the components $p_y$ and $p_x$ of the position vector of the rotor.

Figure 9:
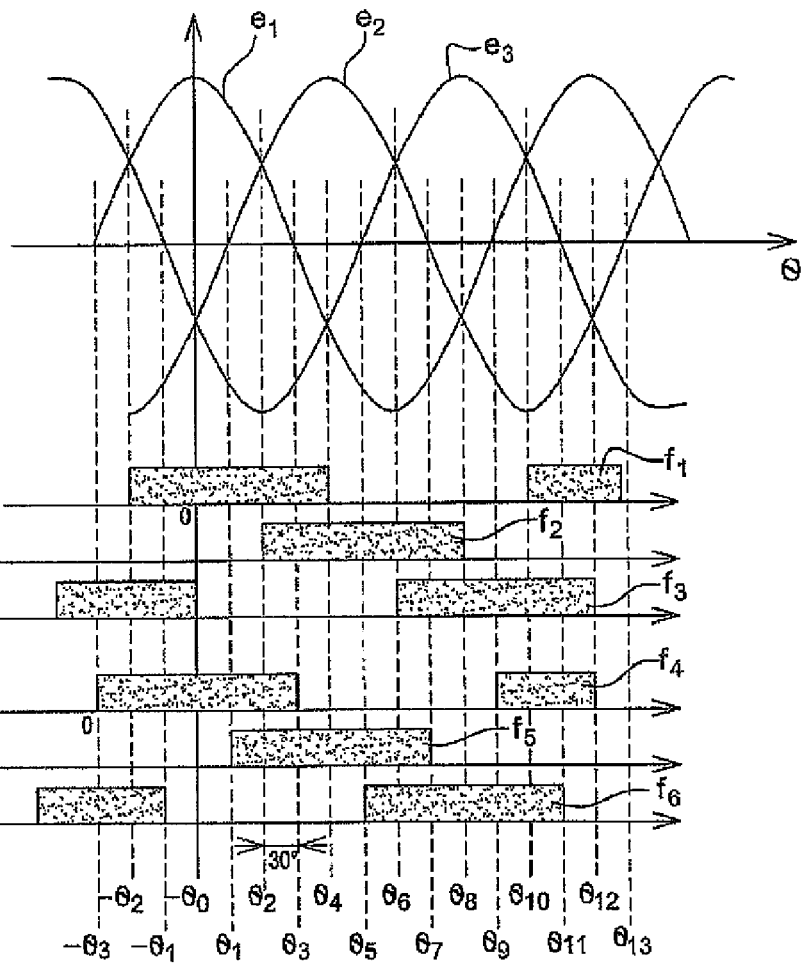
FIG. 9: a graphical representation of the second embodiment of the invention, in the case of a three-phase machine.

FIG. 9 shows in a graph the trend of the curves of the three demodulated electromotive forces and the result of the comparison of the curves in pairs and the result of the comparison of each curve with the zero signal.

The three curves e1, e2 and e3 of the three electromotive forces $e_1$, $e_2$ and $e_3$ are the same as those shown in FIG. 6. Likewise, the three curves f1, f2 and f3 represent the same comparison results as those presented in FIG. 6. The curve f4 represents the binary result of the comparison of the curve $e_1$ with a zero signal. The curve f5 represents the binary result of the comparison of the curve e2 with a zero signal. The curve f6 represents the binary result of the comparison of the curve e3 with a zero signal.

In the interval $-\theta 3$ to $-\theta 2$, the curve e1 being lower than the curve e3 means that the curve f1 is at the low state. The curve e2 being lower than the curve $e_3$ means that the curve f2 is at the low state. The curve e3 being higher than the curve e2 means that the curve f3 is at the high state. The curve e1 being positive means that the curve f4 is at the high state. The curve e2 being negative means that the curve f5 is at the low state. The curve e3 being positive means that the curve f6 is at the high state.

In the interval $-\theta 2$ to $-\theta 1$, the curve e1 becomes higher that the curve e3, giving rise to a change in state of the curve f1. The curve f1 goes to the high state.

In the interval $-\theta 1$ to $-\theta 0$, the curve e3 becomes negative, giving rise to a change in state of the curve f6. The curve f6 goes to the low state.

In the interval $-\theta 0$ to $-\theta 1$, the curve e3 becomes lower than the curve e2, giving rise to a change in state of the curve 13. The curve f3 goes to the low state.

In the interval $\theta 1$ to $\theta 2$, the curve e2 becomes positive, giving rise to a change in state in the curve f5. The curve f5 goes to the high state.

In the interval $\theta 2$ to $\theta 3$, the curve e2 becomes higher than the curve e1, giving rise to a change in state of the curve f2. The curve f2 goes to the high state.

In the interval $\theta 3$ to $\theta 4$, the curve e1 becomes negative, giving rise to a change in state of the curve f4. The curve f4 goes to the low state.

In the interval $\theta 4$ to $\theta 5$, the curve e1 becomes lower than the curve e3, giving rise to a change in state in the curve f1. The curve f1 goes to the low state.

In the interval $\theta 5$ to $\theta 6$, the curve e3 becomes positive, giving rise to a change in state in the curve f6. The curve f6 goes to the high state.

In the interval $\theta 6$ to $\theta 7$, the curve e3 becomes higher than the curve e2, giving rise to a change in state of the curve f3. The curve f3 goes to the high state.

In the interval $\theta 7$ to $\theta 8$, the curve e2 becomes negative, giving rise to a change in state of the curve f5. The curve f5 goes to the low state.

In the interval $\theta 8$ to $\theta 9$, the curve e2 becomes lower than the curve e1, giving rise to a change in state of the curve f2. The curve f2 goes to the low state.

In the interval $\theta 9$ to $\theta 10$, the curve e1 becomes positive, giving rise to a change in state in the curve f4. The curve f4 goes to the high state.

In the interval $\theta 10$ to $\theta 11$, the curve e1 becomes higher than the curve e3, giving rise to a change in state of the curve f1. The curve f1 goes to the high state.

In the interval $\theta 11$ to $\theta 12$, the curve e3 becomes negative, giving rise to a change in state of the curve f6. The curve f6 goes to the low state.

In the interval $\theta 12$ to $\theta 13$, the curve e3 becomes lower than the curve e2, giving rise to a change in state in the curve f3. The curve f3 goes to the low state.

The results of these comparisons are shifted in phase by 30 degrees electrical, which is equal to 360/(4×3) degrees electrical.

FIG. 9 shows the position of a position vector of the rotor produced from the three combinations $C_1$, $C_2$ and $C_3$ respectively of the six signals $R_1+R_{n+1}$, $R_2+R_{n+2}$ and $R_3+R_{n+3}$ representing the position of the rotor. This position vector is obtained in accordance with the following equation:

$$\vec{P(\theta)} = \frac{2}{3}\{C_1 + aC_2 + a^2 C_3\}$$

where $a = e^{j\frac{2\pi}{3}}$

The components $p_x$ and $p_y$ of this position vector are given by:

$$\begin{cases} p_x = \frac{2}{3}\left(c_1 - \frac{c_2+c_3}{2}\right) \\ p_y = \frac{1}{\sqrt{3}}(c_2 - c_3) \end{cases}$$

Figure 10:
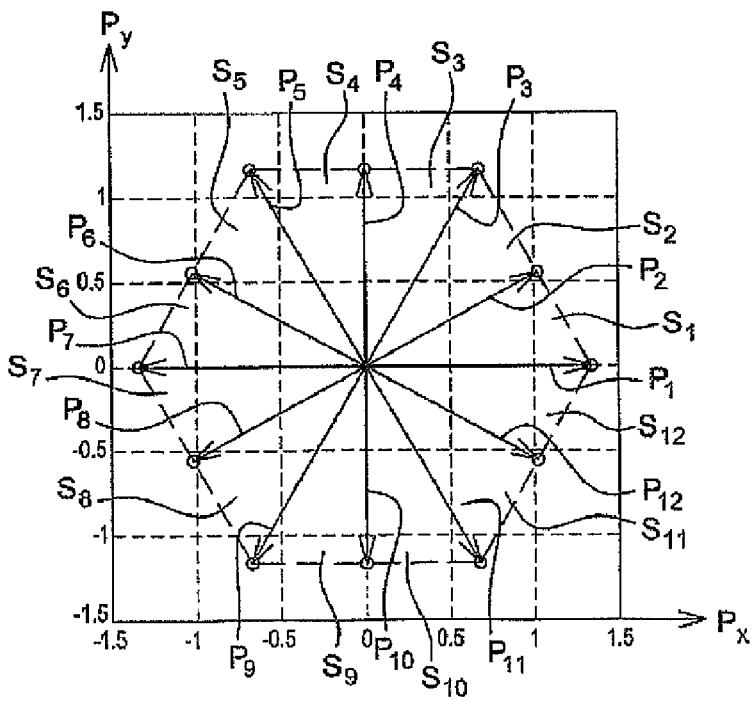
FIG. 10: a representation of the vectorial positions of the rotor at rest or at low speed with the second embodiment according to the invention, in the case of a three-phase machine.

FIG. 10 shows the twelve positions angularly distant by 30° electrical and successively occupied by the position vector. The various position vectors $\vec{P1}$ to $\vec{P12}$ of the rotor show twelve angular sectors S1 to S12 representing the various possible comparisons between the electromotive forces induced by the excitation of the rotor coil and the comparison of each electromotive force with the zero signal.

The first angular sector S1 is formed by the position vector $\vec{P1}$ and $\vec{P2}$ and so on up to the twelfth angular sector S12 which is formed by the position vectors $\vec{P12}$ and $\vec{P1}$. In one example, the position of the rotor is situated in the first sector S1 when:
- the first electromotive force $e_1$ is greater than the third electromotive force $e_3$,
- the second electromotive force $e_2$ is greater than the first electromotive force $e_1$, and
- the first electromotive force $e_1$ is positive, the second electromotive force $e_2$ is negative and the third electromotive force $e_3$ is positive. The detection of the position of the rotor is therefore twice as precise when the information on the changes in signs of the induced electromotive forces is used. The rotor is located at ±15° electrical from its actual position. This makes it possible to define twelve angular sectors of the position vector on a bipolar machine.

The examples of the means described above using the method of the invention can be applied to machines comprising an even number of phases. In the case of a machine comprising an even number of stator windings, the control logic calculates the precision of the rotor according to the distribution of the phases in space.

FIG. 11*a* shows the trend of the curves of the electromotive forces of the six irregularly spaced stator windings. The six stator windings can be distributed in two sub-groups. In this case, they are distributed in two three-phase pairs.

In this case, the first three windings are distributed evenly at 360/n degrees electrical from each other, here equal to 60 degrees electrical. Then the last three windings of the stator are distributed at 360/2n degrees electrical, equal here to 30 degrees electrical, from the first three windings. In other words, the first winding of the second group is phase-shifted by 30 degrees electrical with respect to the first winding of the first group. And so on.

FIG. 11*b* shows the comparison step of the first embodiment of the invention in the case of a machine comprising six irregularly distributed phases. This comparison step, in the example in FIG. 11*b*, uses the comparison of one electromotive force with another as well as the comparison of one electromotive with the opposite of another. The precision of the position of the rotor is equal to 30 degrees electrical with the first embodiment of the invention.

FIG. 11*c* shows the step of comparing the electromotive forces with a zero signal of the second embodiment of the invention.

The second embodiment of the invention combines the results obtained at FIG. 11*b* as well as the results obtained in FIG. 11*c*. The precision obtained with this combination is 15 degrees electrical. With this type of distribution the same precision is obtained as when n is odd.

When the six stator windings are evenly distributed in space, then the precision of the position of the rotor is equal to 60 degrees electrical, with the first method of the invention. This precision is 30 degrees electrical for the second method of the invention. With this type of distribution of the stator windings the precision on the position of the rotor is half as good as when n is even and irregularly distributed.

FIG. 12 shows means implementing the third embodiment of the invention. In this third embodiment the control logic instantaneously uses the measurements of electromotive forces in order to determine an instantaneous position of the rotor with an extremely fine resolution.

To do this, the control logic comprises a digital signal processor 400 called in English a Digital Signal Processor or DSP. This processor 400 is a computer optimised to make complex calculations in a clock pulse, but also to access very easily a large number of digital or analogue inputs. It makes it possible to easily manipulate and process digital signals issuing from the conversion of analogue signals.

To evaluate the position of the rotor at rest, the speed of which is almost zero, the control logic commences by inhibiting the inverter command and then exciting the inducing coil of the rotor by means of the chopper at a sufficiently high frequency to reduce the ripple of the excitation current.

The processor 400 receives at the input of an analogue to digital converter 401 the n electromotive forces e1, e2, e3, . . . , $e_n$. These n analogue signals $e_1$, $e_2$, $e_3$ . . . $e_n$ are converted into digital signals. These n digital signals are each sent to a multiplier. The multiplier 501 comprises a first input 501*a* receiving the first converted electromotive force $e_1$. The multiplier 502 comprises a second input 502*a* receiving the second converted electromotive force $e_2$. The multiplier 503 comprises a first input 503*a* receiving the third converted electromotive force $e_3$. And so on, as far as the multiplier 50*n* comprising a first input 50*na* receiving the $n^{th}$ converted electromotive force $e_n$.

The multipliers 501, 502, 503 . . . 50*n* comprise a second input 504 receiving either a first value equal to: $-1/(a.U_H)$ or a second value equal to: $1/((1-a).U_H)$. Knowing that $U_H$ is the chopper command and a the duty cycle ratio of the chopper. These two values can be changed according to the requirements of the invention.

In order to use one or other of these values, the processor comprises a comparator 402. When the chopper command is positive then the comparator delivers the first value, which is sent to the inputs 504 of each multiplier. Otherwise the input 504 of each multiplier receives the second value.

The data supplied by the multipliers are transmitted to filtering means. The filtering means 601, 602, 603 . . . 60n filter respectively the data received from the multipliers 501, 502, 503 . . . 50n. The signals are filtered with the smallest possible phase modification. The filtered data are sent to a computer 403. By means of predefined calculation rules or by nomograms, the computer calculates the position of the rotor instantaneously. The computer determines the components $p_x$ and $p_y$ of the position vector of the rotor. These components are sent to a digital to analogue converter 404.

The components $p_x$ and $p_y$ always follow the cosine and sine of the angular position of the rotor but with a certain phase advance related to the presence of the speed of the rotor. This advance is lower when the rotation is very slow.

The components of the three embodiments of the invention can be replaced by corresponding components. Likewise other components can be interposed between the components described of the said three embodiments.

Figure 13:
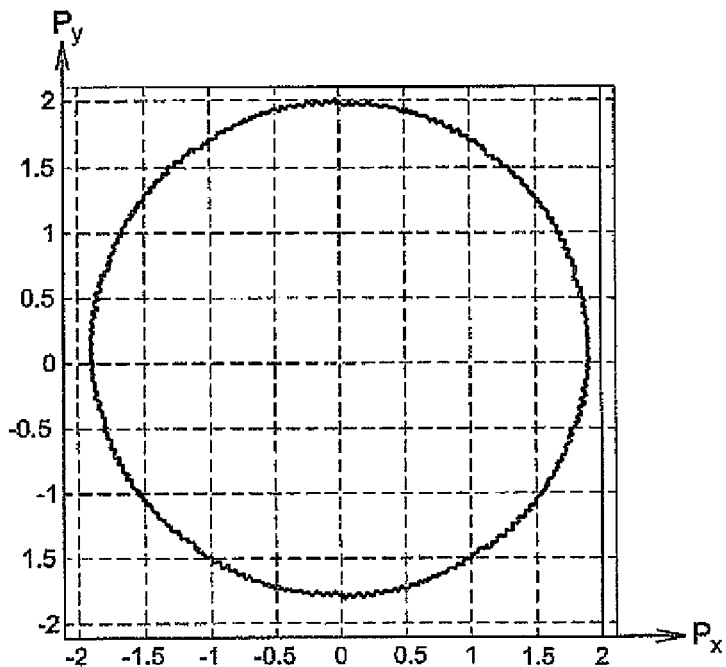
FIG. 13: a representation of quasi-absolute values of the rotor at rest or at low speed with the third embodiment according to the invention.

FIG. 13 shows the various positions occupied by the rotor with respect to the stator, according to the third embodiment. As shown in FIG. 13, all the position vectors of the rotor have a circular shape representing the instantaneous position of the rotor.

The instantaneous position vector of the rotor is given by the following equation:

$$\overrightarrow{P(\theta)} = \frac{2}{n} \cdot \sum_{k=1}^{n} [\cos(\theta - \theta_k) \cdot e^{j\theta_k}]$$

The projections of $\overrightarrow{P(\theta)}$ onto the real and imaginary axis in FIG. 13 are respectively proportional to $\cos(\theta)$ and $\sin(\theta)$. In this case, the position of the rotor is defined by:

$$\theta = arctg\left(\frac{p_y}{p_x}\right)$$

The invention claimed is:

1. Method of determining the position of a rotor (4) of a machine (1), the rotor being provided with at least one excitation winding (25), the excitation winding being connected to a chopper (6), the machine comprising n stator windings, n being an integer number, the rotor being magnetically coupled with each of the n stator windings of the machine, this machine being connected to a control device (2) able to control it in full wave mode or pulse width modulation mode, characterised in that the method comprises the following steps:
  inhibition of the control device,
  application of an excitation voltage variable over time to the rotor, by means of the chopper,
  measurement of an induced electromotive force ($e_1$, $e_2$ or . . . $e_n$) in each of the stator windings,
  determination of a position of the rotor at rest or at low speed, from at least an operation of comparing the induced electromotive forces with each other and at least one operation of comparing an induced electromotive force and a common reference,
  implementation of the commands of the control device, according to the position of the rotor determined.

2. Method according to claim 1, characterised in that the determination of the position of the rotor comprises the following step:
  synchronous demodulation of the electromotive forces measured.

3. Method according to claim 1, characterised in that the method also comprises the step of comparing one induced electromotive force with the opposite of another induced electromotive force.

4. Method according to claim 3, characterised in that
  when a first electromotive force ($e_1$) of the first stator winding is greater than a second electromotive force ($e_2$) of the second stator winding, then a first signal ($C_{1.2}$) equal to 1 is produced, otherwise the first signal ($C_{1.2}$) is equal to 0,
  when the second electromotive force ($e_2$) of the second stator winding is greater than a third electromotive force $e_3$ of the third stator winding, then a second signal ($C_{2.3}$) equal to 1 is produced, otherwise the second signal ($C_{2.3}$) is equal to 0,
  when an $(n-1)^{th}$ electromotive force ($e_{(n-1)}$) of the $(n-1)^{th}$ stator winding is greater than a last electromotive force $e_n$ of the $(n)^{th}$ stator winding then an $(n-1)^{th}$ signal ($C_{(n-1).(n)}$) equal to 1 is produced, otherwise the $(n-1)^{th}$ signal ($C_{(n-1).(n)}$) is equal to 0,
  when the last electromotive force ($e_n$) of the $(n)^{th}$ stator winding is greater than the first electromotive force ($e_1$) of the first stator winding, then an $n^{th}$ signal ($C_{n.1}$) equal to 1 is produced, otherwise the $n^{th}$ signal ($C_{n.1}$) equal to 1 is produced, otherwise the nth signal ($C_{n.1}$) is equal to 0,
  determination of the position of the rotor from the value of the n signals ($C_{1.2}$, $C_{2.3}$, . . . , $C_{(n-1).(n)}$) representing the position of the rotor, according to predefined rules.

5. Method according to claim 3, characterised in that the method comprises, in the case where n is odd and/or the n stator windings are distributed regularly, the following step
  determination of the position of the rotor with a precision 360/2n degrees electrical.

6. Method according to claim 3, characterised in that the method comprises, in the case where n is even and/or the n stator windings are distributed regularly, the following step:
  determination of the position of the rotor with a precision of 360/n degrees electrical.

7. Method according to claim 3, characterised in that the method comprises, in the case where n is even and/or the n/2 windings form a first system of regularly distributed windings, the n/2 other windings form a second system of regularly distributed windings, the two systems being phase-shifted by 360/(2n) degrees electrical, the following step:
  determination of the position of the rotor with a precision of 360/2n degrees electrical.

8. Method according to claim 3, characterised in that the method also comprises the following steps:
  comparison of each electromotive force with a reference signal,
  when the first electromotive force ($e_1$) of the first stator winding is greater than the reference signal, then an $(n+1)^{th}$ signal ($C_{10}$) equal to 1 is produced, otherwise the $(n+1)^{th}$ signal ($C_{10}$) is equal to 0,
  when the second electromotive force ($e_2$) of the second stator winding is greater than the reference signal, then an $(n+2)^{th}$ signal ($C_{20}$) equal to 1 is produced, otherwise the $(n+2)^{th}$ signal ($C_{20}$) is equal to 0,
  when the $(n)^{th}$ electromotive force ($e_n$) of the last stator winding is greater than the reference signal, then a $(2n)^{th}$ signal ($C_{n0}$) signal equal to 1 is produced, otherwise the $(2n)^{th}$ signal ($C_{n0}$) is equal to 0,
  determination of the position of the rotor from the value of the 2n signals ($C_{1.2}$ $C_{2.3}$, . . . , $C_{(n-1).(n)}$, $C_{n.1}$, $C_{10}$, $C_{20}$, ... and $C_{n0}$) representing the position of the rotor, according to predefined rules.

9. Method according to claim 8, characterised in that the method comprises, in the case where n is odd and/or the n stator windings are distributed regularly, the following step:
  determination of the position of the rotor with a precision of 360/4n degrees electrical.

10. Method according to claim 8, characterised in that the method comprises, in the case where n is even and/or the n stator windings are distributed regularly, the following step:
  determination of the position of the rotor with a precision of 360/2n degrees electrical.

11. Method according to claim 8, characterised in that the method comprises, in the case where n is odd and/or the n/2 windings form a first system of regularly distributed windings, the n/2 other windings form a second system of regularly distributed windings, the two systems being phase-shifted by 360/(2n) degrees electrical, the following step:
  determination of the position of the rotor with a precision of 360/4n degrees electrical.

12. Method according to claim 1, characterised in that
  the 2n signals ($C_{1.2}$ $C_{2.3}$, ... $C_{(n-1).(n)}$, $C_{n.1}$, $C_{10}$, $C_{20}$, and $C_{n0}$) are rectangular and of the same frequency,
  they are obtained by a synchronous demodulation.

13. Method according to claim 12, characterised in that the method comprises the following step:
  this synchronous demodulation is a synchronisation defined by a delay relative to a rising edge of the chopper command.

14. Method according to claim 1, characterised in that the method comprises the following steps:
  conversion of the measured electromotive forces into numerical,
  determination of a control voltage ($U_H$) of the chopper and duty cycle ratio ($\alpha$) of the chopper,
  determination of a first value ($-1/(a.U_H)$) and a second value ($1/((1-a).U_H)$) dependent on the control voltage of the chopper and the duty cycle ratio, when the chopper control voltage is positive then each numerical electromotive force is multiplied by the first value, otherwise they are multiplied by the second value,
  determination of a position of the rotor from the results of the multiplications, according to predefined rules.

15. Method according to claim 1, characterised in that the method comprises the following step:
  determination of the position of the rotor, when the machine is at rest.

16. Device for implementing the said method according to claim 1, characterised in that it comprises an electrical machine (1) connected to a control device (2), the said control device being connected to control logic (3), the control logic implementing the said method and supplying a position of the rotor.

17. Device according to claim 16, characterised in that the machine comprises a rotor (4) provided with at least one excitation winding (25) supplied with voltage variable over time by a chopper (6).

18. Device according to claim 17, characterised in that the duty cycle ratio of the chopper belongs to the range [0.01, 0.99].

* * * * *